United States Patent [19]

Abbott

[11] 4,322,542
[45] Mar. 30, 1982

[54] STRONG ANION EXCHANGE COMPOSITION

[75] Inventor: Seth R. Abbott, Concord, Calif.

[73] Assignee: Varian Associates, Inc., Palo Alto, Calif.

[21] Appl. No.: 112,964

[22] Filed: Jan. 17, 1980

[51] Int. Cl.$^3$ .............................................. C07F 7/10
[52] U.S. Cl. .................................................. 556/425
[58] Field of Search ...................... 556/425; 260/429.3, 260/429.5, 448 R

[56] References Cited

U.S. PATENT DOCUMENTS

| | | | |
|---|---|---|---|
| 3,664,967 | 5/1972 | Stehl | 252/431 R |
| 3,783,101 | 1/1974 | Tomb et al. | 195/63 |
| 3,950,588 | 4/1976 | McDougal | 556/427 X |
| 4,013,573 | 3/1977 | Leikhim et al. | 556/418 X |
| 4,043,905 | 8/1977 | Novotny et al. | 210/31 C |
| 4,064,154 | 12/1977 | Chandra et al. | 556/427 X |

OTHER PUBLICATIONS

Snyder et al., "Intro. to Modern Liquid Chromatography", Wiley–Interscience, pp. 287–299, 1974.
Grushka, "Bonded Stationary Phases in Chromatography", J. W. Little et al., pp. 51–58 and 183–184.
"Micromeritics Microsil HPLC Columns–A New Standard in col. for HPLC", Micromeritics Instrument Corporation.
Horvath et al., "Anal. Chem.", 39 (12), pp. 1422–1428 (1967).

Primary Examiner—Paul F. Shaver
Attorney, Agent, or Firm—Stanley Z. Cole; Pauline A. Clarke

[57] ABSTRACT

A strong anion exchange composition useful in monophosphate nucleotide isomer separations is comprised of an inert porous particle having a silyl alkyl ammonium compound fixedly attached by a covalent silicon-oxygen-silicon bond to the surface thereof. A process for synthesizing the strong anion exchange composition in an aqueous solvent is disclosed together with methods for separation of monophosphate nucleotide isomers, highly phosphorylated nucleotides and aldopentose carbohydrates using a column packed with this strong anion exchange composition.

18 Claims, No Drawings

STRONG ANION EXCHANGE COMPOSITION

TECHNICAL FIELD

This invention relates to a novel ion exchange composition, and, more specifically, to a strong anion exchange composition useful as a column packing material, and relates to a process for making the composition.

Background Art

Inorganic column packings such as silica and alumina have been used for years for separation of a wide variety of basic neutral and acidic compounds. During the past few years increased interest in the separation of polar biological compounds which are sensitive to both pH and solvent has led to a great deal of work to modify the polar hydroxyl groups on inorganic packing materials. These modifications are necessary to prevent degradation of either the biological compound or the packing material.

Nucleic acid constituents have been separated by ion exchange chromatography using strong anion or cation exchange functions on cross-linked polystyrene-divinylbenzene resins. Exemplary is Kratovich and Roe, *Journal of Chromatography*, vol. 155, 407 (1978), which describes the use of a polystyrene-divinylbenzene 8% cross-linked quaternary amine strong anion exchange column to achieve baseline separation of the 2'- and 3'-isomers of AMP and GMP and partial resolution of the 2'- and 3'-isomers of CMP and UMP.

It is known to modify a siliceous surface by reaction with monohalogenated silanes, silazanes or silylamines, or with monoalkoxy or monoacetoxysilanes and to chemically modify the reaction product. This type of prior art is illustrated by U.S. Pat. No. 4,043,905 to Novotny et al. Similarly, modification of silica by reaction with benzyltrichlorosilane, followed by modification of the product to a benzylethylhydroxyl dimethyl ammonium ion is known. This type of prior art is exemplified by Unger and Nyamah, *Chromatographia*, vol. 7, No. 2, 63–68 (1974). Also, it is known to form a silica having a quaternary ammonium ion bonded thereby by reacting chlorodimethyl[4-(4-chloromethylphenyl)-butyl]silane with silica, followed by reaction with trimethylamine. This procedure produces a strong anion exchange composition, with a capacity of approximately 200 microequivalents/gram which only weakly retains and resolves some of the purine nucleotides. This type of art is exemplified by Asmus et al, *Journal of Chromatography*, vol. 119, 25–32 (1976).

Furthermore, a silica modified with 3-chloropropyl-trichlorosilane followed by triethylamine is known, as illustrated by Cox et al, *Journal of Chromatography*, vol. 117, 269–278 (1976). However, this modified silica has a very low anion exchange capacity. The silica-silane reaction is carried out under reflux in dioxane.

Moreover, a proprietary strong anion exchange composition having a trimethylammonium ion bonded to a silica by an undisclosed linking group is known. This modified silica known as Partisil-10 SAX (Whatman) is offered as a pellicular packing (37–50μ) and has very low capacity (10–15 μeq/g). In Whatman 1976, Bulletin 116, "Analysis of Nucleic Acid Constituents by High Performance Liquid Chromatography", the chromatogram at page 5, entitled "2', 3' Mononucleotides on Partisil-10-SAX", shows that this material produces only a partial resolution of the 2'- and 3'-monophosphate nucleotides of adenine, uracil, guanine, and cytosine.

Additionally, the reaction of silica with a substituted silane in water is known, as shown by Majors, *Journal of Chromatographic Science*, vol. 12, 767 (1974). However, as described in FIG. 1 of this publication, a polymer is formed. The work of C. J. Bossart in *ISA Transactions*, vol. 7, 283 (1968) appears to similarly form a polymer by the reaction in water at reflux of silica and a $C_6$-trichlorosilane. Thus, the prior art of which I am aware has not produced a strong anion exchange composition that is capable of achieving baseline resolution of 2' and 3' isomers of monophosphate nucleotides such as UMP and furthermore has not produced a strong anion exchange composition having this capability that also has high capacity. Additionally, this prior art fails to provide a process for forming a strong anion exchange composition in water, without polymer formation, from silica and a silane.

My copending applications, Ser. No. 953,380, filed Oct. 23, 1978, and Ser. No. 16,847, filed Mar. 2, 1979, describe the use of an aqueous solvent in reacting an amine-containing alkoxysilane such as N-2-aminoethyl-3-aminopropyltrimethoxysilane with a silica.

DISCLOSURE OF THE INVENTION

It is accordingly one object of the present invention to provide a novel strong anion exchange composition which is capable of providing baseline resolution of the 2' and 3' isomers of a monophosphate nucleotide such as UMP.

A further object of the present invention is to provide a strong anion exchange composition having this capability that has a high capacity.

An even further object is to provide a novel process for preparing a strong anion exchange composition in an aqueous solution, without polymer formation, by the reaction of a silica and a substituted silane compound.

Other objects and advantages of the present invention will become apparent as the description thereof proceeds.

In satisfaction of the foregoing objects and advantages, there is provided by the present invention a strong anion exchange composition that is comprised of an inert porous particle having a size of about 5–20 microns and a silyl alkyl ammonium compound covalently attached to the surface of this particle. This composition is not a polymer and has a high capacity. The ammonium compound has the general formula:

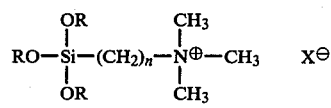

wherein n is an integer ranging from 2–5; R is methyl or ethyl; and X is an exchangeable anion.

This invention also provides a process for the manufacture of this strong anion exchange composition, when the particle is microparticulate silica, that includes the steps of (a) degassing the silica and (b) reacting the ammonium compound with an aqueous slurry of the degassed silica at a time and temperature sufficient to produce the strong anion exchange composition. The ammonium compound is present in a stoichiometric excess ranging up to an about two- to three-fold excess, the excess being that of the ammonium compound to the reactive silanol sites of the silica. The temperature used is below that at which polymerization occurs.

Best Mode for Carrying Out the Invention

As indicated above, one aspect of the present invention is concerned with a novel strong anion exchange composition. This composition is comprised of an inert porous particle to the surface of which is attached a silyl alkyl ammonium compound by covalent chemical bonding through a silicon-oxygen-silicon bond. The particle has a size in the range of from about 5–20 microns, with a size in the range of from about 5–10 microns being preferred.

The particle must be inert, i.e., it must be highly stable in organic solvents and in aqueous buffer solutions of pH about 2–8 at ambient temperature. Exemplary organic solvents in which the particle must be highly stable are hexane, methanol, isopropanol, ethanol, acetonitrile and tetrahydrofuran.

A particle that meets the above requirements is suitably microparticulate silica, alumina, zirconia and titania. Microparticulate silica is especially advantageous, and a high-pressure liquid chromatography (HPLC) grade silica gel is a particularly suitable type of this silica. An HPLC grade silica gel having a high surface area, i.e., about 50 to 800 $m^2/g$, a pore diameter of about 50 Å to 500 Å, and a size of about 5–10 microns is an especially suitable type of silica gel. A silica gel of this type is commercially available as 10 micron Lichrosorb ® Si-60, sold by Merck, Inc. However, any chromatography grade silica gel is suitable for use as the silica.

When employed in the anion exchange composition of this invention, the microparticulate silica can be used in an aqueous buffer solution of pH about 1–8 and alumina can be used in an aqueous buffer solution of pH about 1–10. Microparticulate silica, alumina, zirconia and titania are generally well known to those skilled in the art, and therefore no further description thereof is provided.

The silyl alkyl ammonium compound is represented by the following formula:

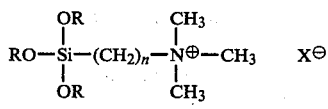

wherein n is an integer ranging from 2–5; R is methyl or ethyl; and X is an exchangeable anion such as a chloride anion and a phosphate anion. In particularly useful compounds of this type, n is 3. In these compounds, R is advantageously methyl. An exemplary compound is N-trimethoxysilyl-propyl-N,N,N-trimethylammonium chloride, sold by Petrarch Systems, Inc. This compound forms a strong anion exchange composition having a capacity of about 750 $\mu eq/g$.

In the silica-containing strong anion exchange composition of this invention, the relatively hydrophobic organic outer portion of the composition provides protection to the silica inner portion against gradual attack by an aqueous solvent, by shielding the silica from the aqueous solvent. This shielding effect exists regardless of the type of particle selected, but is more important for certain of the particle types such as silica. Also, with this silica-containing embodiment of the strong anion exchange composition, charged polar silanol groups are eliminated from the silica surface by tying these groups to a covalent bond. The elimination of the disadvantages associated with silica avoids the adsorption and clogging problems experienced with prior art porous silica compositions.

The invention also provides a process for the manufacture of a strong anion exchange composition according to the present invention, which has microparticulate silica of the type described above as the particle.

In this process of silyl alkyl ammonium compound of the type described above is reacted with an aqueous slurry of the silica. As explained below, the stoichiometry of the reactants and the reaction temperature have critical limits which, if exceeded, result in polymerization. Water is advantageously used as the solvent for preparing the aqueous slurry. The ammonium compound could be reacted with a slurry of the silica in an organic solvent which is suitably acetonitrile or toluene. If an organic solvent were used, polymerization is considerably less of a problem, and thus the stoichiometry of the reactants and reaction temperature become less critical. However, reaction in the organic solvent is not used since a product having remarkably higher coverage is formed in the aqueous solvent. In preparing the slurry, there is advantageously used an amount of silica that will form an about 5–15% by weight slurry, with an amount of silica that will form an about 10% by weight slurry being preferred. A stoichiometric excess of the ammonium compound to reactive silanol sites on the silica is used in the reaction, to maximize the coverage with an about two- to three-fold excess being preferred and being the approximate upper limit. If too great an excess of the ammonium compound were used, then polymerization occurs.

The reaction is conducted for a time and at a temperature sufficient to produce the strong anion exchange composition of the present invention, this composition being the silica with the silyl alkyl ammonium compound covalently bonded thereto. Suitably, the time is about 15 minutes to 24 hours, depending to a large extent upon the temperature selected, with a relatively higher temperature necessitating a relatively lower reaction time. At about ambient temperature, about 75% of the reaction is complete after about 1 hour and the reaction is substantially complete after about 2.5 to 3 hours. Thus, at this temperature, a reaction time of about 4 hours is preferred since completeness of reaction is assured. The temperature selected must be below that at which polymerization occurs, with about ambient temperature being particularly suitable.

Prior to carrying out the reaction, the slurry is degassed. Degassing is carried out to remove trapped air from the silica pores, in order to maximize the coverage. The degassing is carried out by a conventional technique. The reaction is then suitably commenced by adding the ammonium compound to the slurry. It is advantageous to then cap the reaction flask in order to prevent dust contamination.

After reaction, the product is recovered, washed and dried. Recovery is advantageously carried out by filtering the resulting reaction slurry. The filter cake is washed using a series of solvents to remove solvent-soluble impurities. An advantageous series of solvents is water, tetrahydrofuran and methanol. About 500–1500 milliliters of each of these solvents is suitably used in the washing, per 25 grams of material. Then, the filter cake is dried according to conventional procedures.

The strong anion exchange composition of the present invention is useful for separation of monophosphate nucleotide isomers and especially for resolution of the 2' and 3' isomers of such compounds. In addition, this composition is useful for separation of highly phosphorylated nucleotides, which are important regulatory nucleotides involved in the control of RNA synthesis, and for separation of aldopentose carbohydrates such as ribose. Examples of highly phosphorylated nucleotides or "magic spots" are ppppG, ppGpp and pppGpp.

This composition is packed into a chromatography column by forming a slurry in a balanced density solvent such as a tetrabromoethane-tetrachloroethylene solvent or a hexane solvent and adding the slurry at high pressure to the column. The tetrabromoethane-tetrachloroethylene solvent is suitably used for 10 micron silica particles and the hexane solvent is suitably used for 5 micron silica particles. An especially suitable mixture of tetrabromoethane and tetrachloroethylene is 60 parts to 40 parts. An about 5% slurry is used with advantage in packing the column. Advantageously, the packing pressure is about 6,000 to 20,000 p.s.i., with about 10,000 p.s.i. being particularly advantageous. The packed column is prepared for use by washing with a series of solvents that is suitably methanol, water, phosphoric acid and $KH_2PO_4$(pH 3), for silica.

Many problems in biomedical research necessitate analysis of a broad spectrum of compounds in a single matrix. Changes in the composition of intracellular nucleotide pools are monitored as a means of correlating nucleic acid metabolism with the metabolic state of the cell or to characterize the phenotypes of cells with genetic alterations in nucleic acid metabolism. Nucleotides, nucleosides and bases are monitored in the body fluids of humans as a means of identifying elevated or altered patterns of nucleic acid metabolism in tissues, either as a means of disease diagnosis or to follow a course of therapy. The weak anion exchange composition of co-pending application Ser. No. 16,847, filed Mar. 2, 1979, is especially useful for such class separations.

AMP isomer separation is particularly useful in the study of the binding of AMP isomers to clay substrates as a model for the prebiotic evolution of nucleic acids. However, the weak anion exchange composition of the co-pending application is limited in capability to resolve isomers of a given class. Thus, although a mixture of 2', 3', 5' and cyclic 3'-5' AMP isomers can be readily resolved isocratically with this weak anion exchange composition with baseline resolution using 0.01 M $KH_2PO_4$ (pH 2.95), the 2' and 3' isomers of UMP coelute under similar conditions. In contrast, the silica-containing strong anion exchange composition of the present invention readily enables separation of the 2' and 3' isomers of UMP, when a pH greater than about 4 is used.

The silica-containing composition of the present invention is suitable as a chromatography material at a pH of about 2–8, and is particularly suitable at a pH of about 3–5. As just explained, this material is useful for resolving 2' and 3' isomers of UMP when a pH greater than about 4 is used, with a pH of about 4–5 being particularly suitable, and a pH of about 4.5 being especially suitable. The chromatography is advantageously carried out at a pressure that does not exceed 500 atm.

Resolution into separate components of a mixture of 2' and 3' isomers of GMP, UMP, CMP and AMP is best achieved by first eluting the mixture on the weak anion exchange composition of co-pending application Ser. No. 16,847 to isolate the GMP isomers from the UMP isomers from the CMP isomers and the AMP isomers, and then eluting each of the mixtures of 2' and 3' isomers on the strong anion exchange composition of this invention using 0.01 M $KH_2PO_4$ at pH>4.

Specific examples of the present invention are set forth below. Unless otherwise indicated, all percentages are by weight. These examples are merely illustrative and are not in any way to be interpreted as limiting the scope of this invention.

EXAMPLE I

A strong anion exchange material according to the present invention is prepared by the following process. A slurry in 250 ml distilled water of 25 grams of 10 micron Lichrosorb ® Si-60 (a microparticulate silica gel sold by Merck, Inc.) is prepared and then degassed in an ultrasonic bath for about 5 minutes using a water aspirator. To the degassed slurry there is added 50 ml of N-trimethoxysilylpropyl-N,N,N-trimethylammonium chloride (sold by Petrarch Systems, Inc. as a 50% solution in methanol), the reaction vessel is capped, and the reaction is allowed to proceed for 4 hours at room temperature. The reaction product is then filtered on a medium sintered glass filter funnel, and there is recovered on the funnel as a filter cake the desired strong anion exchange composition, which is a silica having the silylpropyl-N,N,N-trimethylammonium group covalently bonded thereto. The filter cake is washed with each of the following solvents, in turn: 500 ml water, 500 ml THF, 1000 ml THF, and 500 ml methanol. The washed cake is then dried.

EXAMPLE II

A 5% slurry of the silica produced in Example I in a 60/40 tetrabromoethane-tetrachlorethylene solvent system is packed in a 4 mm×30 cm column at 10,000 p.s.i. The packed column is washed with each of the following solvents in turn: 120 ml methanol, 120 ml water, 60 ml 0.1 M phosphoric acid, and 120 ml 0.01 M $KH_2PO_4$ (pH 3).

To this column, there is added a mixture of the 2', 3', 5', and cyclic isomers of GMP. Using 90 atm pressure, the column is eluted with 0.01 M $KH_2PO_4$ at pH 4.1 at room temperature. At a flow rate of 2 ml/min. the isomers are resolved in about 20 minutes.

EXAMPLE III

To the column of Example II, a mixture of the 2' and 3' isomers of UMP is added. The column is eluted with 0.02 M $KH_2PO_4$ at pH 4.5 at 30° C. At 2 ml/min. and at a pressure no greater than 120 p.s.i., the isomers are resolved in 20 minutes.

EXAMPLE IV

To the column of Example II, there is added a mixture of guanosine tetra- and pentaphosphate isomers (ppppG, ppGpp and pppGpp). The column is eluted at 30° C. using a 10–90% B at 2% B per minute gradient elution where the gradient is (A) 0.01 M $KH_2PO_4$ (pH 4.5) and (B) 0.75 M $KH_2PO_4$ (pH 4.5). At a flow rate of 2 ml/min. and at a pressure no greater than 500 atm., the isomers are resolved in 32 minutes.

EXAMPLE V

Following the procedure of Example IV, adenosine tetra- and pentaphosphate isomers (pppA, ppApp and pppApp) are resolved in 33–34 minutes.

EXAMPLE VI

To the column of Example II, there is added a mixture of ribose, fructose, dextrose and sucrose. The column is eluted at 30° C. with 70% acetonitrile to 30% water. At a flow rate of 2 ml/min. and at a pressure of about 70 atm, 100% recovery of ribose is obtained within 5 minutes. The ribose is the first component of the mixture off the column.

I claim:

1. A strong anion exchange composition having a high capacity, said composition comprising microparticulate silica having a size of about 5–20 microns, and a silyl alkyl ammonium compound covalently attached to the surface of said microparticulate silica by reacting an aqueous slurry of said microparticulate silica with said ammonium compound, said reaction comprising (a) de-gassing said silica and (b) reacting said ammonium compound with an aqueous slurry of said degassed silica for a time and at a temperature sufficient to produce said composition; said ammonium compound being present in a stoichiometric excess ranging up to an about two-to-three fold excess, said excess being that of the ammonium compound to the reactive silanol sites of said silica; and said temperature being below that at which polymerization occurs; and said ammonium compound having the general formula:

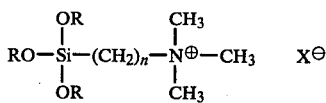

wherein n is an integer ranging from 2–5; R is methyl or ethyl; and X is an exchangeable anion.

2. The composition of claim 1 wherein the ammonium compound is present in an about two- to three-fold excess.

3. The composition of claim 1 wherein the reaction is carried out for about 4 hours at about ambient temperature.

4. The composition of claim 1 wherein said silica is a high pressure liquid chromatography grade silica gel.

5. The composition of claim 1 wherein said particle has a size of about 5–10 microns.

6. The composition of claim 1 wherein the aqueous solvent used in forming said aqueous slurry is water.

7. The composition of claim 1 wherein n is 3.

8. The composition of claim 1 wherein R is methyl.

9. The composition of claim 1 wherein said silica gel has a size of about 5–10 microns, and said ammonium compound is N-trimethoxy silyl-propyl-N,N,N-trimethyl ammonium chloride.

10. A process for the manufacture of a strong anion exchange composition comprising an inert porous particle having a size of about 5–20 microns, and a silyl alkyl ammonium compound covalently attached to the surface of said particle; said particle being microparticulate silica, and said ammonium compound having the general formula:

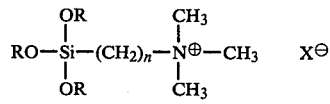

wherein n is an integer ranging from 2–5; R is methyl or ethyl; and X is an exchangeable anion, said process comprising (a) degassing said silica and (b) reacting said ammonium compound with an aqueous slurry of said degassed silica at a time and temperature sufficient to produce said composition; said ammonium compound being present in a stoichiometric excess ranging up to an about two- to three-fold excess, said excess being that of the ammonium compound to the reactive silanol sites of said silica; and said temperature being below that at which polymerization occurs.

11. The process of claim 10 wherein the ammonium compound is present in an about two- to three-fold excess.

12. The process of claim 10 wherein the reaction is carried out for about 4 hours at about ambient temperature.

13. The process of claim 10 wherein the aqueous solvent used in forming said aqueous slurry is water.

14. The process of claim 10 wherein said silica is a high pressure liquid chromatography grade silica gel.

15. The process of claim 10 wherein said silica has a size of about 5–10 microns.

16. The process of claim 10 wherein n is 3.

17. The process of claim 16, wherein R is methyl.

18. The process of claim 15 wherein said ammonium compound is N-trimethoxy silyl-propyl-N,N,N-trimethyl ammonium chloride.

* * * * *